US008241447B2

(12) United States Patent
Thomasset

(10) Patent No.: US 8,241,447 B2
(45) Date of Patent: Aug. 14, 2012

(54) METHOD FOR MANUFACTURING TUBES BY WELDING

(75) Inventor: Jacques Thomasset, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 100 days.

(21) Appl. No.: 12/937,457

(22) PCT Filed: Apr. 4, 2009

(86) PCT No.: PCT/IB2009/051428
§ 371 (c)(1),
(2), (4) Date: Nov. 1, 2010

(87) PCT Pub. No.: WO2009/125330
PCT Pub. Date: Oct. 15, 2009

(65) Prior Publication Data
US 2011/0041991 A1   Feb. 24, 2011

(30) Foreign Application Priority Data

Apr. 10, 2008   (WO) ................. PCT/IB2008/051362

(51) Int. Cl.
*B32B 37/00*   (2006.01)
(52) U.S. Cl. .......... 156/82; 156/203; 156/218; 156/229; 156/322
(58) Field of Classification Search ............ 156/82, 156/157, 202, 203, 217, 218, 229, 304.1, 156/322
See application file for complete search history.

(56) References Cited

U.S. PATENT DOCUMENTS 6,726,863 B2 * 4/2004 van Lenthe et al. ......... 264/40.7
7,217,379 B2 * 5/2007 van Lenthe et al. ......... 264/40.7

FOREIGN PATENT DOCUMENTS

| CH | 695 937 | 10/2006 |
|---|---|---|
| DD | 81 03 868 | 5/1981 |
| DE | 81 03 868 | 5/1981 |
| GB | 1 553 177 | 9/1979 |
| WO | WO 2004/039561 | 5/2004 |

OTHER PUBLICATIONS

International Search Report for PCT/IB2009/051428, mailed Dec. 18, 2009.
Foreign-language Written Opinion of the International Searching Authority for PCT/IB2009/051428, mailed Dec. 18, 2009.
English Translation of Written Opinion (IPRP Chapter I) for PCT/IB2009/051428.

* cited by examiner

*Primary Examiner* — James Sells
(74) *Attorney, Agent, or Firm* — Nixon & Vanderhye P.C.

(57) ABSTRACT

Method of welding a strip for the production of flexible tubular bodies made of plastic, comprising the following steps: shaping of a strip (1) around a welding rod; contacting of the ends (3, 4) of the strip; formation of a welded zone (5) by heating and compressing said ends (3, 4) and then by cooling them, said method being characterized in that the strip (1) is also heated outside the welded zone (5).

15 Claims, 2 Drawing Sheets

METHOD FOR MANUFACTURING TUBES BY WELDING

This application is the U.S. national phase of International Application No. PCT/IB2009/051428 filed 4 Apr. 2009, which designated the U.S. and claims priority to PCT/IB2008/051362 filed 10 Apr. 2008, the entire contents of each of which are hereby incorporated by reference.

FIELD OF THE INVENTION

The invention relates to the manufacture of flexible packaging by welding plastic films. More specifically, the invention relates to the formation of flexible tubes intended for storing and delivering liquid or pasty products.

PRIOR ART

Flexible tubes consisting of a head and a flexible skirt, obtained by welding a "laminate" strip, the laminate being formed from several plastic or metal layers, are known. The skirts are obtained as follows: by paying out a strip; by forming the strip into a tubular body; by welding the ends of the strip, generally making a slight overlap; and finally by cutting the tubular body into segments of identical length. A tube head is then welded or molded onto the end of said skirt. The tube head includes a neck with an orifice and a shoulder connecting the neck to said skirt. The tube is thus delivered to the packager, head down and with the delivery orifice closed off (by a screwed plug for example) so as to be filled via that end of the tube which has remained open. Once the tube has been filled, the end is closed by pinching and welding the film to itself.

One difficulty encountered when making flexible tubes by welding lies in the deformation of the skirt during the welding operation. Often, the skirts reduced do not have a perfectly circular geometry as is desirable, but has a "pear"-shaped or "water droplet"-shaped cross section. Such circularity defects are particularly prejudicial to the tube assembly and filling operations. Assembly of the skirt to the head by welding requires the insertion of the head into the skirt, which operation is trickier the greater the lack of circularity. During filling, the packager must insert a nozzle via that end of the tube which has remained open. This operation is greatly disturbed when the cross section of the tube is not circular.

The circularity of the skirts has an influence on the final geometry of the tube and in many cases the circularity defects impair the esthetic properties of the packaging. For this reason, it is desirable to have perfectly circular skirts.

Patent application WO 2004/039561 proposes deforming the laminate beyond the elastic region prior to the welding operation. A first method proposed in the application WO 2004/039561 consists in thinning the strip by about 1% by calendering. A force of between 2.5 and 500 newtons per millimeter of width of the strip must be applied. When the strip comprises more than 70% plastic by volume, it is suggested to heat said strip to a temperature between 75 and 120° C. before calendering. A second method proposed in patent application WO 2004/039561 consists in carrying out an embossing operation, resulting in the creation of bumps and hollows, the amplitude of which is preferably between ⅟₁₅ and ⅓ times the width of the strip. This calendering or embossing operation has the effect of modifying the residual stresses in the laminate. According to the inventors, this method makes the elastic behavior of the strip uniform and in the case of embossing enables the stiffness of the strip both in the machine direction and in the cross direction to be increased. However, the method proposed in patent application WO 2004/039561 has several drawbacks. The patent application cannot be easily used with printed strips and especially when the printing is on the surface. This is because the calendering or embossing operation has a tendency to damage the printing owing to the deformation, temperatures and rubbing brought about by the method.

Another method for improving the circularity of the tubes is proposed in Swiss patent CH 695937 A5. This method consists in carrying out a heat treatment on the tubular body before it is cut into segments of identical length. The tubular body is made according to the prior art, the welding process comprising in particular the following: a shaping step in which the strip is wound around a welding rod, so as to form a cylindrical body; a heating step, so as to melt the ends of the strip to be welded; a step of compressing the ends to be welded; and a step of cooling the welded zone. Patent CH 695937 A5 proposes to carry out a heat treatment on the tubular body after the welding process. The heat treatment consists in making the temperature of the tubular body uniform by means of a fluid in contact with the external surface of the tube. The device used for carrying out the heat treatment is inserted between the welding device and the cutting device. One drawback of the method proposed in patent CH 695937 A5 is due to the space requirement for carrying out an effective heat treatment. This space is greater the thicker the laminate, so that the proposed method proves to be unsuitable for thick laminates and high production rates.

SUMMARY OF THE INVENTION

The invention consists of a welding process for producing tubular skirts by welding a laminate. The skirts are obtained as follows: by paying out a strip; by forming the strip into a tubular body; by welding the ends of the strip, these being in butting or overlapping contact; and finally by cutting the tubular body into segments of identical length, called "skirts".

The welding process according to the invention consists, before, during or after the welding operation, in heating the strip, preferably to a temperature above 60° C., outside the welded zone.

In this description of the invention, the expression "welded zone" represents that part of the strip which is heated, compressed and cooled in the welding process. The welded zone which is not limited to the contacted part of the strip, rather it includes that part of the strip thermally affected by the welding operation.

The term "strip" is understood to mean a sheet formed from several plastic or metal layers.

According to one method of implementing the invention, the strip heating operation is carried out before the strip is formed around the welding rod. Advantageously, the strip is heated to a constant temperature in the run direction of the strip, which is also parallel to the axis of the tube, and with a temperature profile in the direction perpendicular to the run direction of the strip, which is also the circumferential direction of the tube.

According to a second method of implementation, the strip heating operation is carried out while the ends of the strip are being welded and not sequentially thereto.

A third method of implementation consists in heating the strip after the welding operation, and for example after the tubular body has been cut into sections of identical length and during the operation of welding the head of the tube to the tubular body.

BRIEF DESCRIPT OF THE DRAWINGS

FIG. 1 illustrates the cross section of a tubular body having circularity defects which the invention makes it possible to remedy.

FIG. 2 illustrates the temperature profile of the strip 2 after the ends 3 and 4 of the strip have been welded.

DETAILED DESCRIPTION OF THE INVENTION

Figure 1:
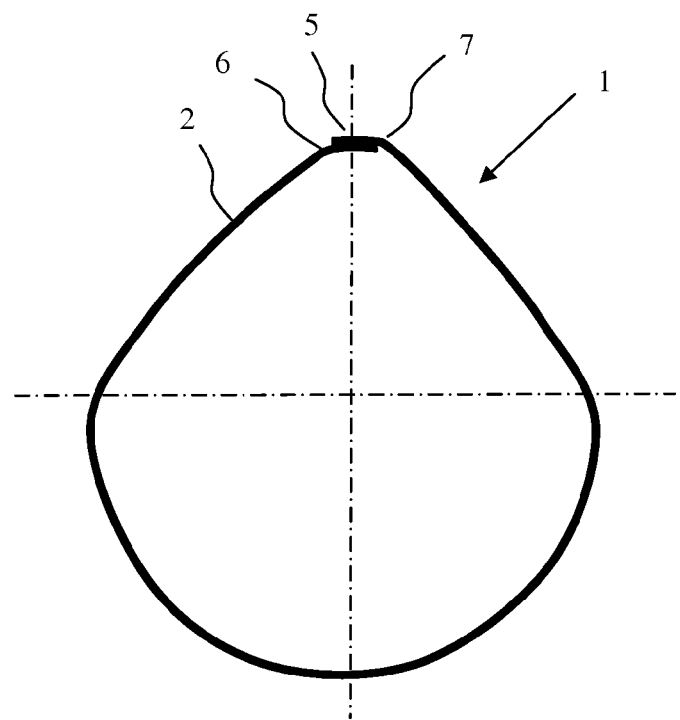

FIG. 1 illustrates the cross section of a tubular body having circularity defects which the invention makes it possible to remedy. The cross-sectional defects result from the formation of the tubular body by welding using the known methods of the prior art and without operations before or after the welding process, such as those described in the prior art WO 2004/039561 and CH 695937 A5. The tubular body 1 results from welding a strip 2, the welded ends 3 and 4 of which generally overlap in the welded zone 5. Another method consists in butt-welding the ends 3 and 4 of the strip. In both cases, circularity defects 6 and 7 located near the welded zone 5 and generally affecting the roundness of the tubular body are observed.

The welding process according to the invention consists, during the welding operation, in heating the strip, preferably to a temperature above 60° C., again outside the welded zone.

Figure 2:
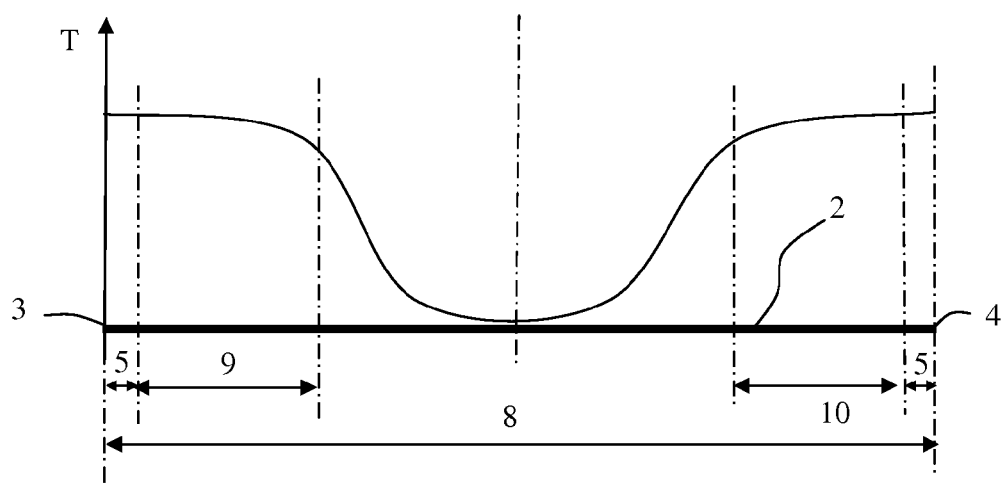
Figure 3:
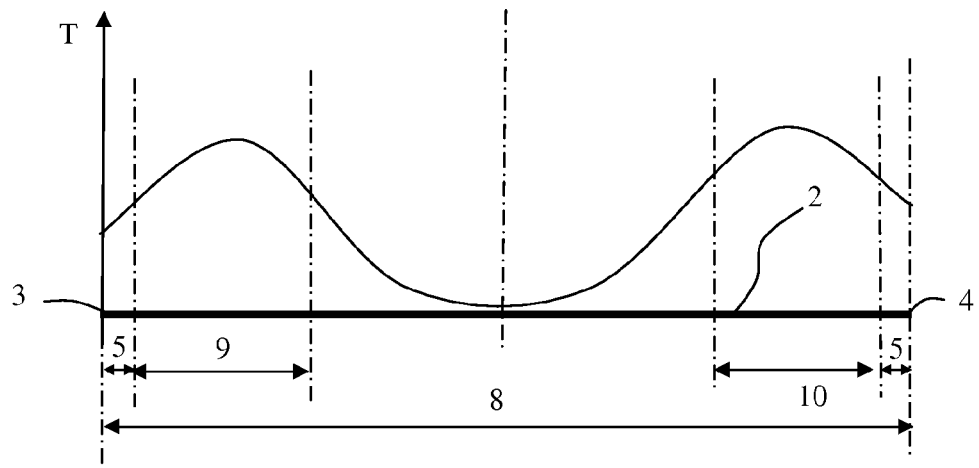
FIG. 3 illustrates a second example of a temperature profile of the strip 2 after the ends 5 have been welded.

Advantageously, the strip is heated to a constant temperature in the run direction of the strip, which is also parallel to the axis of the tube, and with a temperature profile in the direction perpendicular to the run direction of the strip, which is also the circumferential direction of the tube. Examples of temperature profiles in the transverse direction are illustrated in FIGS. 2 and 3. FIGS. 2 and 3 show the section of the tube 2 perpendicular to the run direction. To make the representation of the temperature profile easier to understand, the strip is shown flat and not a tubular geometry. This representation of the invention must not be considered restrictively. The strip heating operation in the welding process may be carried out when the strip forms a flat surface or when the strip forms a tubular body, or else in the intermediate forming part.

FIG. 2 illustrates the temperature profile of the strip 2 after the ends 3 and 4 of the strip have been welded, the welding process consisting in carrying out a succession of heating, compressing and cooling operations on the zone 5. During the welding operation, means are used to heat the strip outside the welded zone 5. The temperature profile of the strip after the step of welding the tubular body is shown in FIG. 2.

By heating the strip outside the welded zone 5, tubular bodies of perfectly circular cross section may be obtained. FIG. 2 shows that the zones 9 and 10 adjacent to the welded zone 5 are heated to a temperature close to the temperature of the zone 5. Heating the zones 9 and 10 avoids too steep a temperature gradient close to the welded zone. The heated widths of the zones 9 and 10 may extend respectively to about ¼ of the total width 8 of the strip. In certain cases, it may be advantageous to heat the strip over its entire width to a uniform temperature. The zones 9 and 10 of the strip are heated so that their temperature after welding is preferably between 40 and 90° C. The temperature of the zones 9 and is adjusted according to the properties of the strip, the thickness of the strip and the welding speed.

FIG. 3 illustrates a second example of a temperature profile of the strip 2 after the ends 5 have been welded. FIG. 3 shows that the temperature of the zones 9 and 10 is higher than that of the welded zone 5. This temperature difference makes it possible, in the case of multilayer strips, to correct for circularity defects caused by the welding of the ends 3 and 4 of the strip.

Figure 4:
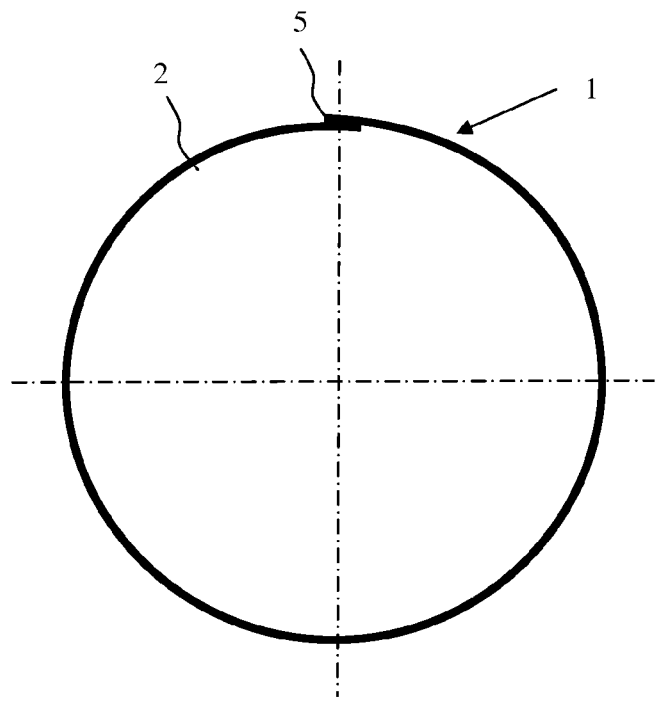
FIG. 4 illustrates the tubular bodies obtained by the process described in the invention.

FIG. 4 illustrates the tubular bodies obtained by the process described in the invention. By adjusting the temperature profile, the circularity defects illustrated in FIG. 1 are eliminated. The invention may be used for making tubular bodies 1 produced by welding the ends of a strip 2, said ends forming an overlap 5 or being butted together.

According to a first method of implementing the invention, the operation of heating the strip is carried out before the forming of the strip around the welding rod.

According to a second method of implementation, the operation of heating the strip is carried out while the ends of the strip are being welded together, and not sequentially.

A third method of implementation consists in heating the strip after the tubular body has been cut into sections of identical length and during the operation of welding the head of the tube onto the tubular body.

A preferential method of heating the laminate consists in using hot air, which is blown onto the internal or external surface of the strip. An air temperature of between 150° C. and 650° C. is used.

A device for adjusting the air flow rate, the air temperature, the temperature profile and the heating length is particularly useful. This device is advantageously positioned in the zone preceding the step of forming the strip around the welding rod. This device makes it possible to improve the roundness of the tubes over a wide diameter range, said range generally being between 12.5 mm and 75 mm. This device is readily adaptable to the production rate of the machine, by jointly adjusting the air temperature, the air flow rate and the heating length. Very round tubes can be obtained by using this device.

Other methods and devices for heating by radiation, by conduction or by induction may be used to heat the strip.

The invention may be combined with other devices that exist for improving the roundness of the tubes by stretching the welded zone. The invention is advantageously combined with the device described in patent application EP 07116384.4.

The invention is particularly advantageous as it is integrated into the welding process, unlike other methods consisting in carrying out a post-treatment on the tube.

After welding, the heated parts may be at a temperature equal to or greater than the temperature of the welded zone.

The invention claimed is:

1. A process for welding a strip for making flexible tubular plastic bodies, comprising the following steps:
    a strip is shaped around a welding rod;
    the ends of the strip are brought into contact with each other;
    a welded zone is formed by heating, pressing together and cooling said ends;
    the roundness of said tubular bodies is firstly improved by stretching the welded zone; and
    the roundness of said tubular bodies is secondly improved by also heating the strip outside the welded zone.

2. The process as claimed in claim 1, in which the strip is also heated outside the welded zone before the formation of the welded zone.

3. The process as claimed in claim 1, in which the strip is also heated outside the welded zone during the formation of the welded zone.

4. The process as claimed in claim 1, in which the strip is also heated outside the welded zone after the formation of the welded zone.

5. The process as claimed in claim 1, in which said ends are brought into butting contact.

6. The process as claimed in claim 1, in which said ends are brought into overlapping contact.

7. The process as claimed in claim 1, in which the strip is heated to at least 60° C. outside the welded zone.

8. The process as claimed in claim 1, in which the strip is heated outside the strip, over its entire width.

9. The process as claimed in claim 8, in which the strip is heated to a constant temperature over its entire width.

10. The process as claimed in claim 1, in which the strip is not heated over its entire width.

11. The process as claimed in claim 1, in which the strip is heated outside the strip, by varying the heating temperature along its width.

12. The process as claimed in claim 11, in which the strip is heated close to the welded zone to a temperature equivalent to the heating temperature of the welded zone.

13. The process as claimed in claim 12, in which the heating close to the welded zone is carried out over a length substantially equal to half the width of the strip.

14. The process as claimed in claim 11, in which the strip is heated close to the welded zone to a temperature above the heating temperature of the welded zone.

15. The process as claimed in claim 1, in which the strip is heated outside the welded zone by means of hot air.

* * * * *